Jan. 14, 1964     I. D. JACOBSON     3,117,622
HEAT TRAP FOR HOT WATER STORAGE TANKS
Filed June 9, 1961

INVENTOR.
IRVIN D. JACOBSON
BY
ATTORNEYS

# United States Patent Office 3,117,622
Patented Jan. 14, 1964

3,117,622
HEAT TRAP FOR HOT WATER STORAGE TANKS
Irvin D. Jacobson, Painesville, Ohio, assignor to Perfection Pipe Nipple Company, Madison, Ohio, a corporation of Ohio
Filed June 9, 1961, Ser. No. 116,067
7 Claims. (Cl. 165—132)

This invention relates generally to automatic storage type water tanks, but has reference more particularly to tanks of this type which are electrically heated.

It is conventional practice, in electrically-heated water heaters or hot water storage tanks, to provide a cold water inlet tube and a hot water outlet tube or pipe which carries the hot water from the top of the tank to the hot water faucets in a plumbing system. In some cases, the inlet tube is adjacent the bottom of the tank, and in others, the cold water is introduced into the tank through a dip tube extending into the tank from the top of the tank.

It is also customary to heat the tank by means of electrically-heated coils which are embedded in the walls of the tank, or are immersed in the water in the tank.

In a system of this character, there is constant radiation of heat from the walls of the hot water outlet tube, which creates a circulation of the hot water in the water outlet tube, which circulation may be termed "auto-circulation." This "auto-circulation" is disadvantageous, because it not only interferes with the efficiency of the water heating, but also interferes with the drawing off of water of the desired temperature, that is, at a temperature at which the water can be drawn off instantaneously at maximum temperature.

The present invention has as its primary object the provision of a device which I term a heat trap, and which functions to inhibit the "auto-circulation" of the water which has been described.

Another object of the invention is to provide a device of the character described, which is so constructed as to minimize direct transfer of heat from the hot water through the device to the walls of the tank and the outlet pipe.

Other objects and advantages of my invention will be apparent during the course of the following description.

In the accompanying drawings forming a part of this specification, and in which like numerals are employed to designate like parts throughout the same.

Figure 1:
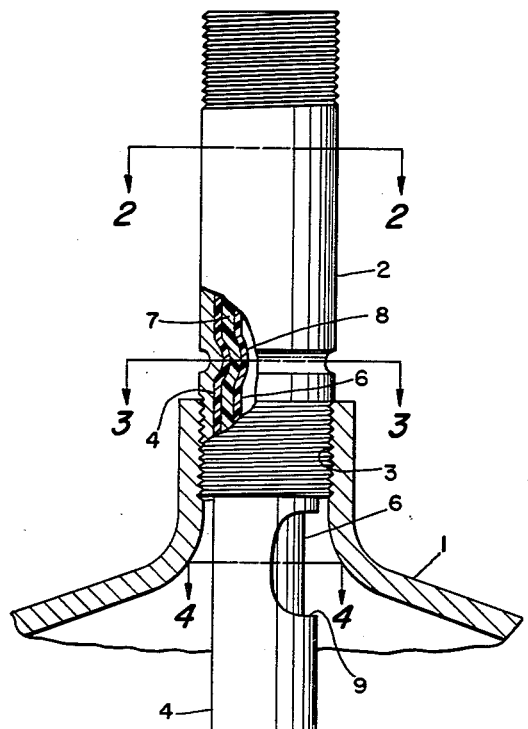
FIG. 1 is a fragmentary view, partly in elevation and partly in cross-section, showing the heat trap, as installed in the top of a hot water storage tank.
Figure 2:
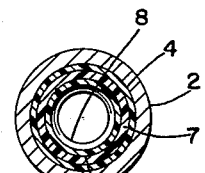
FIG. 2 is a cross-sectional view, taken on the line 2—2 of FIG. 1.
Figure 3:
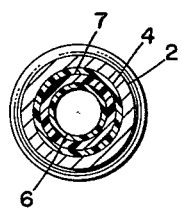
FIG. 3 is a cross-sectional view, taken on the line 3—3 of FIG. 1.
Figure 4:
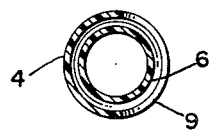
FIG. 4 is a cross-sectional view, taken on the line 4—4 of FIG. 1.

Referring more particularly to the drawings, reference numeral 1 designates the top of a conventional electrically-heated water storage tank, which is supplied at its bottom with cold water through an inlet (not shown) which passes through the side wall of the tank adjacent the bottom of the tank.

The heat trap which is the subject of this invention is an assembly or unit which consists of a metallic nipple 2, which is secured in a threaded opening 3 in the top 1 of the tank, a plastic tube 4, which is closed at the bottom, as at 5, a second plastic tube 6 which is concentric with the tube 4, and a plastic spacer 7, interposed between the upper portions of the tubes 4 and 6.

The nipple 2, tube 4, spacer 5 and tube 6 are interlocked to each other in the manner described in my copending application, Serial No. 800,296, forming an inwardly extending annular bead 8, whereby the parts are rigidly secured to each other, and an effective water-tight seal is provided between the parts.

The tube 4 has an opening 9 in the wall thereof, just below the nipple 2, and the tube 6 is open at the top and bottom. The upper end of the tube 6 is connected to the hot water faucets of the house plumbing system.

When hot water is drawn off from the tank, through the upper end of the tube 6, the water inside the tank, just below the top 1 of the tank, enters the opening 9, then passes downwardly through the space 10 between the tubes 4 and 6, then up through the upper end of the tube 6.

Since the water must travel downwardly before it can leave the tank and enter the water outlet tube above the tank, the auto-circulation in the water outlet tube is inhibited, and the water has a better opportunity of becoming properly heated before it is drawn off through the water outlet tube. In a sense, therefore, the device acts as a heat trap, preserving the heat content of the water, pending its use. Moreover, the use of electricity in the heating of the water in the tank is conserved.

Due to the use of plastic materials in the construction of the heat trap, transfer of heat directly through the walls of the tubes and spacer is minimized, with the result that very little heat from the water is transferred to the nipple 1 and the tank itself, so that the insulative properties of the heat trap aid in increasing the efficiency of the water heating.

The restricted size of the opening 9, through which the water leaves the tank also tends to inhibit or discourage the commencement of the auto-circulation which has been described.

The method of locking the nipple, spacer, and tubes together provides a seal which is effective to cause the water to flow in the prescribed path.

It is to be understood that the form of my invention, herewith shown and described, is to be taken as a preferred example of the same, and that various changes may be made in the shape, size and arrangement of parts thereof, without departing from the spirit of the invention or the scope of the subjoined claims.

Having thus described my invention, I claim:

1. A heat trap of the character described, comprising a nipple adapted for securement in the top of a hot water storage tank, a tube extending through said nipple and to a point below said nipple, said tube being closed at its lower end, and a second tube extending through said nipple into said first tube and in concentric spaced relation to the latter, said second tube being open at both ends, its lower open end being spaced from and substantially adjacent the bottom of the first tube, said first tube having an opening in its side wall subjacent said nipple and well above the opening in the lower end of the second tube for admitting water from an upper portion of the storage tank into the space between the tubes.

2. A heat trap, as defined in claim 1, in which said tubes are of plastic material.

3. A heat trap, as defined in claim 2, including a cylindrical spacer of plastic material interposed between the portions of said tubes within said nipple.

4. A heat trap, as defined in claim 3, including means for interlocking the nipple, tubes and spacer with each other.

5. A heat trap, as defined in claim 4, in which said interlocking means comprises annular beads on the nipple, tubes and spacer which are in nested relation with each other.

6. In combination with a water storage tank having a top and a threaded opening in said top, a heat trap comprising a metallic nipple threadedly secured in said threaded opening, a tube extending through said nipple and downwardly into the upper part of said tank, said tube being closed at its lower end, a second tube extending through said nipple and downwardly into said first tube, in concentric spaced relation to the latter, said second tube being open at both ends, its lower open end being spaced from and substantially adjacent the bottom of the first tube, said first tube having an opening in its side wall below said nipple adjacent the top of the tank and well above the opening in the lower end of the second tube for admitting water from an upper portion of the storage tank into the space between the tubes, said tubes being of plastic material, and a cylindrical spacer of plastic material interposed between the portions of said tubes within said nipple, said nipple, tubes and spacer being interlocked with each other, said interlock consisting of annular beads formed on the nipple, tubes and spacer, which are in nested relation with each other.

7. A heat trap of the character described, comprising an externally threaded metallic nipple adapted for threaded securement in the top of a hot water storage tank, a tube extending through said nipple and downwardly to a point below said nipple, said tube being closed at its lower end, a second tube extending through said nipple and downwardly into said first tube, in concentric spaced relation to the latter, said second tube being open at both ends, its lower open end being spaced from and substantially adjacent the bottom of the first tube, said first tube having an opening in its side wall subjacent said nipple and well above the opening in the lower end of the second tube for admitting water from an upper portion of the storage tank into the space between the tubes, said tubes being of plastic material, and a cylindrical spacer of plastic material interposed between the portions of said tubes within said nipple, said nipple, tubes and spacer being interlocked with each other, said interlock consisting of annular beads formed on the nipple, tubes and spacer which are in nested relation with each other.

References Cited in the file of this patent

UNITED STATES PATENTS

| 163,100 | Orme et al. | May 11, 1875 |
| 319,232 | Goubert | June 2, 1885 |
| 1,723,082 | Schumann | Aug. 6, 1929 |
| 2,428,768 | Bertram | Oct. 14, 1947 |
| 2,801,828 | Wilson | Aug. 6, 1957 |
| 2,921,606 | McCauley | Jan. 19, 1960 |

FOREIGN PATENTS

| 363,954 | France | May 18, 1906 |
| 984,551 | France | Feb. 28, 1951 |